Sept. 6, 1938.　　　W. J. BLANCHARD　　　2,128,983
AIRCRAFT POWER PLANT CONTROL
Filed March 26, 1935　　　2 Sheets-Sheet 1

INVENTOR.
WERNER J. BLANCHARD.
BY
ATTORNEYS.

Sept. 6, 1938.  W. J. BLANCHARD  2,128,983
AIRCRAFT POWER PLANT CONTROL
Filed March 26, 1935  2 Sheets-Sheet 2
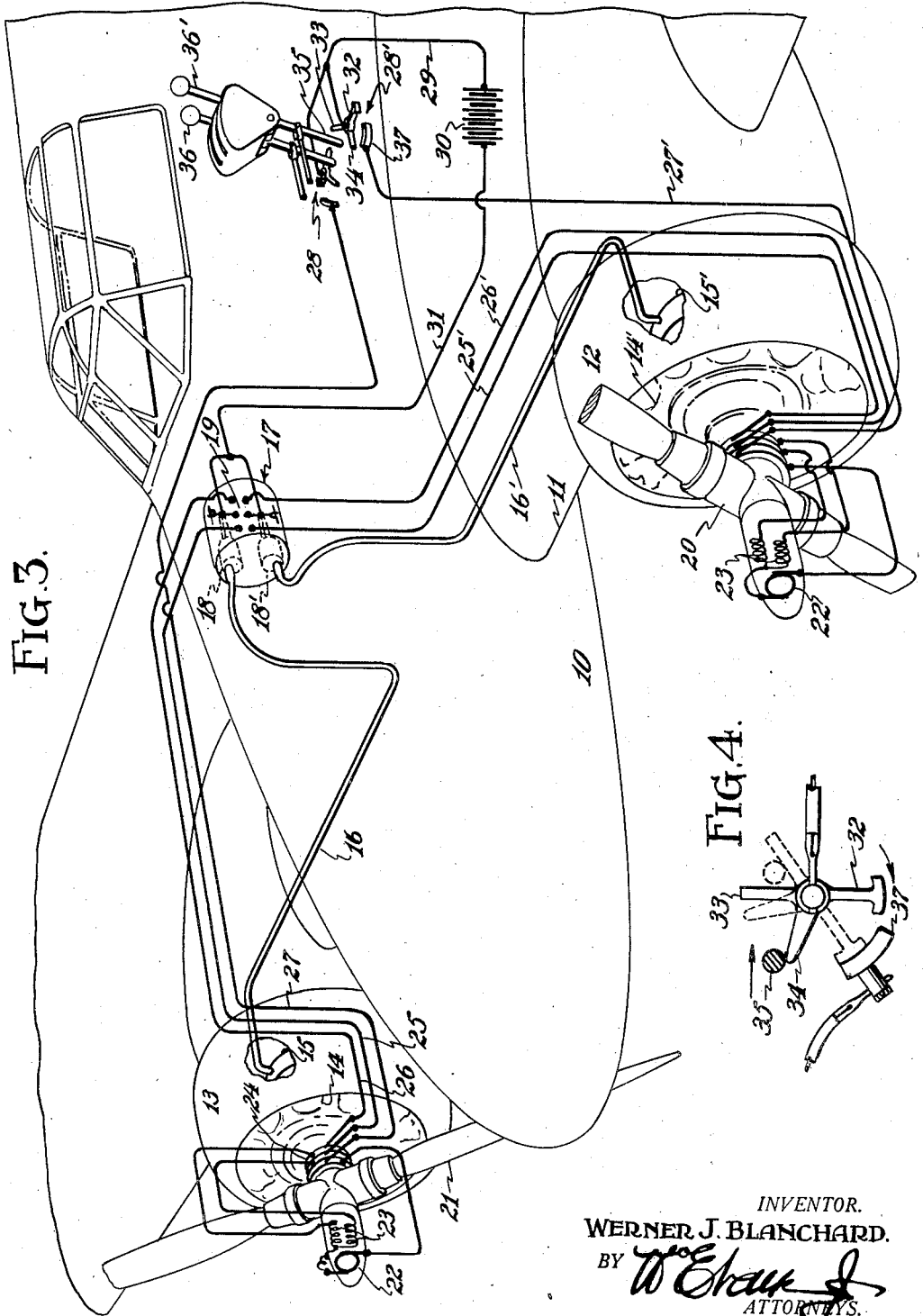
INVENTOR.
WERNER J. BLANCHARD.
BY
ATTORNEYS.

Patented Sept. 6, 1938

2,128,983

UNITED STATES PATENT OFFICE 2,128,983

AIRCRAFT POWER PLANT CONTROL

Werner J. Blanchard, Kenmore, N. Y., assignor, by mesne assignments, to Curtiss-Wright Corporation, a corporation of New York Application March 26, 1935, Serial No. 13,031

5 Claims. (Cl. 170—135.6)

This invention relates to aircraft power plant control apparatus.

More particularly, the invention concerns control apparatus as applied to aircraft power plants including an internal combustion engine, preferably of the supercharged type and a controllable pitch propeller operated by the engine, the propeller pitch being variable in operation, between limiting minimum and maximum pitch conditions.

An object of the invention is to provide means by which the propeller pitch is adjusted in response to changes in the intake manifold pressure of the engine.

A further object is to provide means by which the optimum manifold pressure may be pre-set on a suitable dial, and to provide operating means by which the pre-set manifold pressure is maintained by variations in propeller pitch with consequent variations in R. P. M. of the power plant.

Still another object is to provide a group control for a plurality of aircraft power plants by which similar manifold pressures may be maintained in all power plants, the blade pitch of the individual propellers of each power plant being changeable in response to tendencies toward variation in the individual manifold pressure of that power plant from the pre-set standard.

Still another object is to provide means by which the manifold pressure control apparatus for the propeller becomes operative at a predetermined position of the individual engine throttle, so that, when operating at open throttle conditions, the propeller pitch is made responsive to manifold pressure, but when operating at part throttle conditions, the manifold pressure—propeller pitch control—becomes inoperative.

Still another object is to provide a novel form of speed synchronizing mechanism for a plurality of aircraft power plants.

A further object is to provide manifold pressure-responsive means for controlling the pitch changing operation of an electrically operated controllable pitch propeller.

Further objects will become apparent in reading the annexed specification and claims, and in viewing the drawings, in which:

Fig. 3 is a diagrammatic perspective view showing the interconnection of the manifold pressure-responsive instrument with two power plants of an aircraft; and Fig. 4 is a diagrammatic plan showing the throttle switch mechanism by which the control apparatus is made active or inactive in accordance with throttle position.

Figure 1:
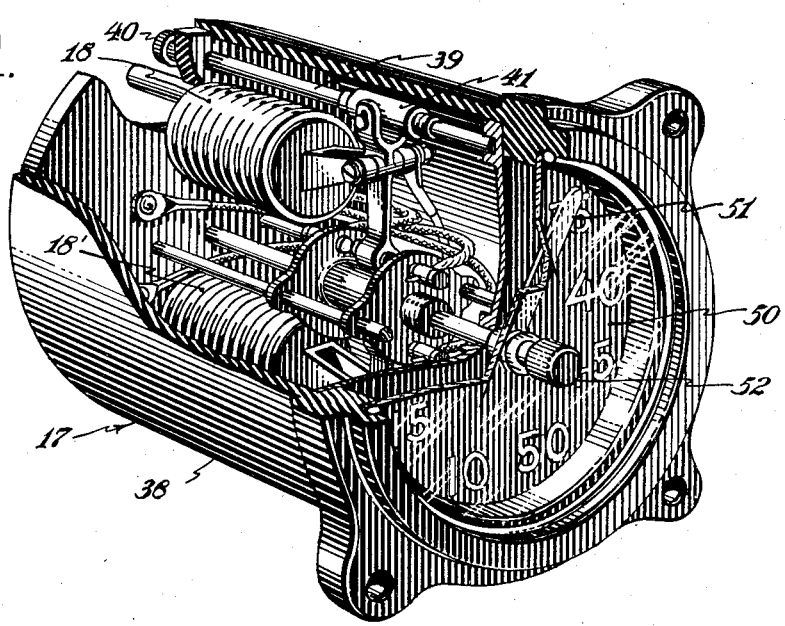
Fig. 1 is a perspective view, partly broken away, of the manifold pressure-responsive instrument which controls the operation of a plurality of controllable pitch propellers.

Referring to Fig. 3, an aircraft fuselage 10 is shown having laterally extending wings 11 on which aircraft power plants 12 and 13 are mounted. The power plants are substantially identical and comprise internal combustion engines 14 and 14' having intake manifolds 15 and 15' which are subject to the action of a supercharger forming part of the engine in a manner well known in the art. The supercharger ordinarily maintains a fuel mixture pressure in the manifold of greater than atmospheric pressure under full throttle conditions, while, of course, under part throttle conditions, the manifold pressure may be equal to or substantially less than atmospheric pressure. To the manifolds 15 and 15' conduits 16 and 16' are respectively attached. These conduits lead into the fuselage and to a control instrument 17 provided with a pair of "Sylphon" bellows 18 and 18' with which the conduits 16 and 16' respectively communicate. These "Sylphons" 18 and 18' control electrical switching mechanism 19, later to be described. Each power plant includes a controllable pitch propeller of the electrically operated type such as that shown in my Patent Number 1,951,320, a propeller 20 being provided for the power plant 12 and a propeller 21 being provided for the power plant 13. Each propeller is the same and includes an electric motor 22 having forward and reverse field windings 23 communicating with a slip-ring and brush organization 24. Wires 25 and 26 which govern the forward and reverse operation of the motor 22 of the propeller 21 extend to the switching mechanism 19. Likewise, wires 25' and 26' extend from the slip-rings of the propeller 20 to the switching mechanism 19. The wires 27 and 27' from the propellers 21 and 20, respectively, extend to throttle-operated switches 28 and 28', thence through a common wire 29 to the battery 30, and thence through a common wire 31 to the switching mechanism 19. Each throttle switch comprises a lost motion rock arm 32 having fingers 33 and 34 engageable by an extension 35 of the throttle lever 36. The arm 32 may contact, upon opening of the throttle, with a switch segment 37, which closes the circuit of the switching mechanism 19 and propellers. The fingers 33 and 34 are so spaced (as shown in Fig. 4) that the switch 28 is closed when the throttle is open about three-quarters. The switch remains closed to the full throttle position, and is not again opened until the throttle has been closed about one-quarter of the way. Thus, the automatic mechanism involving the unit 17 and the controllable pitch propellers is only operative in the upper range of throttle opening for each engine.

Figure 2:
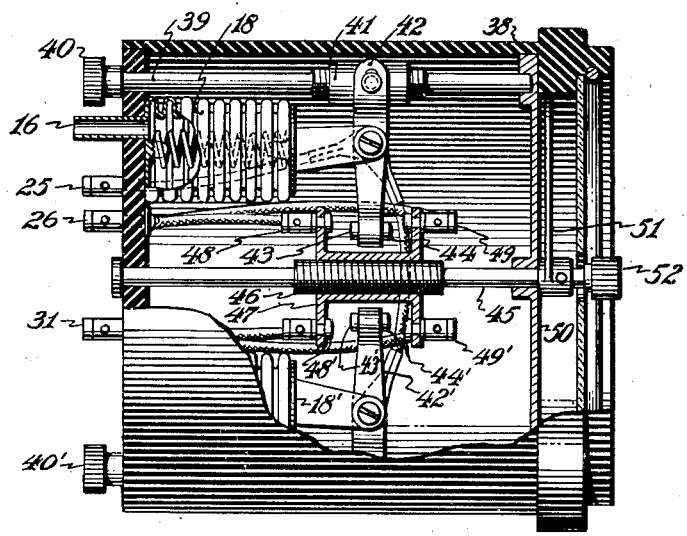
Fig. 2 is a side elevation, partly in section, of the instrument.

The instrument 17 (as shown in Figs. 1 and 2) comprises a case 38, within which the "Sylphons" 18 and 18' are attached. Also mounted within the case is a screw shaft 39 having an adjusting knob 40 on which a non-turning nut 41 is carried, this nut having pivoted thereto an arm 42 pivoted also to the movable end of the sylphon 18 and carrying at its inner end a pair of opposed switch contacts 43 and 44. A central shaft 45 extends through the instrument having a screw-threaded central portion 46 on which a collar 47 is translatable upon turning of the shaft 45. The collar 47 carries insulated opposed electric contacts 48 and 49 connected respectively to the wires 25 and 26. The wire 31 is grounded on the instrument and thereby is connected to the contacts 43 and 44. A dial 50 is provided on the instrument over which an indicating hand 51 passes, the latter being fast on the shaft 45. The dial is calibrated preferably in inches of mercury absolute and, by the adjusting knob 52, the shaft 45 may be turned to permit the hand to register with any desired manifold pressure setting. The elements 39 to 42, inclusive, are duplicated for the sylphon 18' and are designated as primed numbers.

The operation of the device, relating to its effect on the operation of one power plant, such as 13, is as follows. As the engine throttle 36 for the power plant 13 is opened, the switch 28 is closed and the manifold pressure builds up, by virtue of the supercharger, to an appreciable pressure. It may be assumed for illustration that the knob 52 has been turned to pre-set a desired manifold pressure of thirty-five pounds per square inch. If the throttle is open, say eighty percent, and if the propeller pitch were initially high, the propeller 21 would impose such a drag on the engine that its rotational speed would be held down, by which full power is not developed and by which manifold pressure is held down. A temporary condition may therefore arise where the manifold pressure may be thirty pounds per square inch. This pressure is communicated from the manifold 15 to the sylphon 18, thereby turning the arm 42 to cause engagement of the contacts 43 and 48. This actuates the propeller pitch changing motor 22 to decrease propeller pitch. Upon decrease of pitch, the R. P. M. of the engine gains headway with consequent increase in manifold pressure. As the manifold pressure, then, attains the figure of thirty-five pounds per square inch, the contacts 43 and 48 separate and further pitch changing of the propeller is stopped. Thus, the equilibrium condition with a thirty-five pound manifold pressure is automatically attained for the then current throttle opening. Should the throttle be opened further, the reverse action as heretofore described will occur, until a new equilibrium condition is attained at a higher pitch setting of the blades, whereat greater power is absorbed. Should the ship be nosed down with power on, the engine revolutions would tend to increase, building up a higher manifold pressure. When this occurs, the pressure is communicated to the sylphon 18, whereupon the contacts 44 and 49 engage, causing an increase in the pitch of the propeller blades by actuation of the motor 22. Thus, the propeller will absorb the greater amount of the engine power, tending to reduce the R. P. M. and stabilizing the R. P. M. again at the desired value of thirty-five pounds manifold pressure. In another condition, we may assume that the aircraft has been flying under full throttle level flight conditions, whereat the manifold pressure has balanced at thirty-five pounds, and whereat the propeller pitch setting has attained a fixed medium pitch condition.

Now assuming relatively full throttle setting, and that the ship be nosed up for climb, the additional load upon the engine with the cumulative reduction in surrounding air density will accrue to reduce engine R. P. M., consequently reducing the manifold pressure. Thereby, the contacts 43 and 48 engage to reduce the pitch of the propeller by which the propeller load becomes less and the engine tends to speed up to bring the manifold pressure, and the R. P. M. back to standard. In the high altitude condition, a compensating factor arises in that the low air density tends to permit faster rotation of the propeller with a lesser power input thereto, whereby the new propeller pitch setting attained through the automatic operation of the mechanism will be at some angle divergent from that previously indicated, but the balance between the power produced by the engine and the power absorbed by the propeller will maintain.

Generally speaking, at some fixed altitude, the manifold pressure will be proportional to engine R. P. M. At an optimum manifold pressure at fixed altitude, the R. P. M. will be relatively constant, and the mechanism of this invention functions to adjust the propeller to a pitch setting which will absorb full engine power. At high altitude, assuming that the supercharger is capable of boosting the intake manifold pressure to the pre-set standard, full engine power will be developed at substantially the same R. P. M. as developed at the lower altitude, but it becomes necessary at the higher altitude to increase the propeller pitch, due to lowered air density, in order to absorb the full engine power as developed. Therefore, it may be stated generally that the apparatus maintains full engine power regardless of altitude, within the range whereat the supercharger is capable of boosting the manifold pressure to attain full power. The propeller pitch condition for low altitude flight will be relatively flat, whereas the propeller pitch to absorb the full engine power at high altitude will be relatively steep. This, of course, conforms to those propeller controls in the prior art which are governed in response to engine speed.

This apparatus serves not only to govern engine speed and to adjust the propeller accordingly, but also serves to govern manifold pressure which is an important consideration with supercharged engines.

It has been found that manifold pressure is a quite accurate indication of engine R. P. M., and it is essential for supercharged engines that manifold pressure be controlled in order that a danger point of high manifold pressure may not be reached. Ordinarily, a gauge is provided for the indication of manifold pressure which must be observed by the pilot, and he must adjust the throttle and propeller pitch settings in such a manner that a specific manifold pressure be not exceeded. By the use of this device, the maximum, or desired, manifold pressure may be preset, after which the pilot may pay no further attention thereto, since this pre-set manifold pressure is maintained by the automatic variations in propeller pitch also automatically maintaining the propeller at a setting that absorbs full power at full engine R. P. M. He need only operate the throttle as usual to control the amount of power needed.

A condition can arise, of course, in a power dive where the maximum allowable manifold pressure may be exceeded—that is, the engine and propeller will tend to speed up to such an extent that the maximum pitch position of the propeller may be reached and that maximum pitch position is not sufficient for the propeller to absorb full engine power. Thereupon, manifold pressure may continue to increase to a dangerous degree. This is a special flight condition, and would call for closure of the engine throttle by the pilot to keep the engine from attaining too high a rotational speed and too high a manifold pressure.

The instrument 17 is shown in the drawings as adapted for two power plants and serves as a synchronizing device therefor. Variations in manifold pressure in one or the other power plant will effect propeller pitch changes in the power plants to maintain the pre-set manifold pressure in both. Obviously, the instrument 17 could be arranged for only one power plant, or could be arranged for more than the two shown.

It is known that different engines may have slightly different power characteristics, but the power variations in similar engines will seldom vary more than about five percent. The screw shaft 39 with the associated nut 41 and arm 42 may be adjusted to compensate for the difference in power characteristics between the engine 20, and other power plants of the craft, such as 21. The manually controlled knob 40 for one power plant, and similar knobs for each other power plant, may be individually adjusted to compensate the power characteristics of the respective engine, so that by the adjustment of several of the knobs 40, all power plants of the aircraft may be brought into a power balance for operation under equal power conditions in flight.

In the operation of this apparatus it is, of course, assumed that the throttle settings of all the power plants will be substantially identical, which is readily accomplished by similar movement of the several throttles 36 and 36'.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft including a plurality of substantially similar power plants each comprising a supercharged internal combustion engine and a power driven controllable pitch propeller including electrical control means therefor; a unitary device including an expansible diaphragm connected to the intake manifold of each engine, a switch arm operated by each diaphragm, a common contact carrier for all said arms having contacts connected to respective propeller control means for effecting pitch change of the propellers in response to arm contacts due to changes in manifold pressure, and single adjusting means for said carrier whereby the effect of manifold pressure change on propeller adjustment is effected simultaneously for all power plants.

2. In aircraft including a plurality of substantially similar supercharged internal combustion power plants each having adjustable power control means, a unitary device comprising a plurality of expansible diaphragms each communicating with the intake manifold of one of said engines, a contact element movable with each diaphragm in response to manifold pressure changes of respective power plants, a common adjustable carrier having contacts engageable by respective arms, and means operated by contacts of said arms with said carrier for controlling the power of respective power plants.

3. A manifold pressure control device for a plurality of supercharged internal combustion engines comprising a plurality of pressure responsive expansible diaphragms each communicating with the manifold of one engine, an element on each diaphragm movable in response to movement of that diaphragm, a carrier associated with said elements adjustable to various positions with respect to said elements, and means controlled by the position of said elements relative to said carrier for altering the manifold pressure of respective engines.

4. A manifold pressure control unit for a plurality of internal combustion engines comprising a support, a plurality of similar expansible diaphragms mounted thereon, an arm movable with each diaphragm upon expansive or contractive movement thereof having electrical contactors on opposite sides thereof, a single bifurcated member embracing the several arms having electrical contactors adapted to be contacted by the arm contactors, and means for adjusting the position of said member.

5. A manifold pressure control unit for a plurality of internal combustion engines comprising a support, a plurality of similar expansible diaphragms mounted thereon, an arm movable with each diaphragm upon expansive or contractive movement thereof having electrical contactors on opposite sides thereof, a single bifurcated member embracing the several arms having electrical contactors adapted to be contacted by the arm contactors, means for adjusting the position of said member, and means for independently adjusting each arm with respect to said enbracing member.

WERNER J. BLANCHARD.